United States Patent [19]

Ebner et al.

[11] Patent Number: 5,452,094
[45] Date of Patent: Sep. 19, 1995

[54] METHOD AND APPARATUS FOR STORAGE AND PRINTING OF LOGOS USING A STORAGE MEDIUM CAPABLE OF STORING MULTIPLE LOGOS

[75] Inventors: Fritz F. Ebner; Luong Ta, both of Rochester, N.Y.

[73] Assignee: Xerox Corporation, Stamford, Conn.

[21] Appl. No.: 971,810

[22] Filed: Nov. 5, 1992

[51] Int. Cl.$^6$ ............................................... H04N 1/21
[52] U.S. Cl. ............................ 358/296; 358/450; 358/452; 358/537; 355/202; 395/147
[58] Field of Search ............... 358/450, 452, 453, 537, 358/538, 540, 440; 355/201, 262, 244; 395/147, 149

[56] References Cited

U.S. PATENT DOCUMENTS

| 4,409,621 | 10/1983 | Richards et al. | 358/260 |
| 4,986,526 | 1/1991 | Dastin | 271/277 |
| 5,124,799 | 6/1992 | Tsuboi et al. | 358/296 |
| 5,142,355 | 8/1992 | Fujima | 358/75 |
| 5,191,429 | 3/1993 | Rourke | 358/296 |

FOREIGN PATENT DOCUMENTS

414152A2 2/1991 European Pat. Off.
435053A3 7/1991 European Pat. Off.
478335A2 4/1992 European Pat. Off.

OTHER PUBLICATIONS

Patent Abstracts of Japan, vol. 15, No. 102 (E-1043) 12 Mar. 1991 & JP-A-02 309 863 (Canon Inc) 25 Dec. 1990.
Patent Abstracts of Japan, vol. 15, No. 62 (E-1033) 14 Feb. 1991 & JP-A-02 288 469 (NEC Corp) 28 Nov. 1990.

*Primary Examiner*—Peter S. Wong
*Assistant Examiner*—Randy W. Gibson
*Attorney, Agent, or Firm*—Oliff & Berridge

[57] ABSTRACT

An apparatus and method enable any user of a digital copier to store and retrieve customized images of a relatively small size, such as, for example, logos or letterheads, for incorporation into larger document images. Customized logo images can be input using the copier RIS and stored for future use, or can be input from an external use such as, for example, a personal computer. Full size document images and logo images can be either merged or overwritten. The logo image storage capacity is increased over prior art systems through the use of an electronic memory card, a data storage disk, and/or a personal computer, either individually or in combination.

20 Claims, 4 Drawing Sheets

METHOD AND APPARATUS FOR STORAGE AND PRINTING OF LOGOS USING A STORAGE MEDIUM CAPABLE OF STORING MULTIPLE LOGOS

FIELD OF THE INVENTION

This invention relates generally to electronic printing systems, and more particularly, concerns a method and apparatus for storage and printing of relatively small customized images such as, for example, letterheads and logos (hereinafter referred to generally as logos) that are subsequently incorporated into a full size (i.e., paper size) original image.

BACKGROUND OF THE INVENTION

As electronic copiers have evolved, they have been improved with a wide range of image enhancement and image manipulation capabilities that save time and cost while providing versatile and complex features.

One feature that is particularly useful is the incorporation of customized images such as, for example, letterheads or logos, of a relatively small area, into original images scanned from an original document and then copied (one or multiple times) onto plain paper.

Initially, logos were added using rudimentary, manually realized, cut and paste techniques, or by ordering the service from an expensive specialized print shop. Currently, however, sophisticated electronic reprographic (ER) systems, such as the Docutech family of products by Xerox Corporation, allow the user to save entire document images and enhance them in myriad ways. Some of the features include adding image data, highlight color, cut and paste features, etc. These systems, however, are very expensive and often provide more features than required in a small office environment. A more cost effective approach for small offices is the use of lower capacity, lower complexity and lower cost reprographic systems. Among these systems is the 5775 family of color copiers by Xerox Corporation. These copiers provide some of the capabilities of high-end copiers without the associated costs. In particular, lower cost systems such as the 5775 have a limited memory capacity such that an entire page image cannot be stored (and thus cannot be manipulated) as is done in higher end systems such as Docutech. Instead, as an original image is being read by a RIS, the data representative of a small portion of the document image is temporarily stored, and then processed prior to being supplied to a print engine (such as a ROS) for use in forming a latent image on a photoreceptor. That is, as the original document is being scanned with the RIS, the ROS receives data representative of the image from an earlier scanned portion of the same original document. This common architecture/process does not require large amounts of memory and its associated costs.

One of the features scoped in the initial design of the 5775 family of copiers is the ability to print a prepackaged electronically stored logo on a portion of a copy sheet as it is being printed. Basically, the logo feature allows the user to scan an original document having a document image that has no logo or letterhead, and then print the document image on a copy sheet with a superimposed logo or letterhead by electronically manipulating the scanned document image to add the previously stored logo or letterhead image thereto. The logo feature allows the user to place customized images of a relatively small area over original images in order to print letterheads or logos on plain paper. The 5775 copiers implement the logo feature using a video read only memory (ROM) chip that is installed inside the copier. However, due to the limited memory capacity of the ROM, this approach forces the user to purchase, and have custom burned, a ROM chip for each custom image he wants to use. In addition, in order to switch images, one ROM chip must be removed and another one installed. These limitations are both expensive and time consuming.

The present invention enables any user of a digital copier to store and retrieve small, logo type video patterns. Logo images can be input using the copier RIS and stored for future use, or can be input, for example, from an external source such as a PC (personal computer). Preferably, multiple logo images can be stored on a small size storage medium in the copier. Moreover, the present invention will provide less expensive copiers with some of the flexibility of the larger, expensive high-end ER (Electronic Reprographic) systems, without the associated costs.

SUMMARY OF THE INVENTION

It is, therefore, an object of the present invention to provide a new and improved system for incorporating customized images having a relatively small area into original document images being copied onto copy sheets.

Another object of the present invention is to provide increased storage capacity for customized images.

Another object of the present invention is to enable the user to update, manipulate, add, delete and replace customized images at will.

Another object of the present invention is to provide a method for enabling the user of a low cost digital copier to store and retrieve customized video patterns and to incorporate them into original document images without incurring the associated costs of a high-end ER system.

These and other objects, features and advantages will become apparent to those skilled in the art from the following detailed description, when read in conjunction with the appended claims.

The present invention provides a system for the incorporation of customized images of a relatively small area, such as, for example, logo images (including letterhead images), into original document images to be copied onto copy sheets, comprising: an image input means for scanning an original document image or a logo image; an image processing means for processing and transmitting the scanned image, in accordance with instructions provided by an operator through a user interface, to a print engine means for printing the image transmitted by the image processing means on a copy sheet such as plain paper or to a logo image storage means for reading, writing and storing a plurality of logo images; and a user interface means for defining modes of operation of the copier apparatus. Specifically, the modes of operation include a straight copy mode, a logo input mode, and a logo printing mode. When in the straight copy mode, scanned document images are supplied to the print engine means in the usual way to provide exact copies (i.e., without logos) of the original document. When in the logo printing mode, a user specified logo previously stored in the logo image storage means is incorporated into a document image (e.g., by overwriting a portion of the document image with logo image or by merging (ORing) a portion of the document image with the logo image) in a known fashion as the document is being scanned so that the images formed on the copy sheets include the logo. When in the logo input mode, a small logo image is scanned by the image input means and then stored in the logo image storage means. The logo image storage means is preferably a memory card or magnetic disk appropriate for storing multiple logo images. Alternatively, or additionally, logo images can be input, for example, from a PC (i.e., without using the copier scanner).

BRIEF DESCRIPTION OF THE DRAWINGS

Other features and advantages of the present invention will become apparent as the following detailed description is read with reference to the following drawings in which like reference numerals denote like elements, and in which.

DETAILED DESCRIPTION OF PREFERRED EMBODIMENTS

While the present invention will hereinafter be described in connection with a preferred embodiment, it will be understood that it is not intended to limit the invention to that embodiment. On the contrary, it is intended to cover all alternatives, modifications and equivalents as may be included within the spirit and scope of the invention as described by the appended claims.

Figure 1:
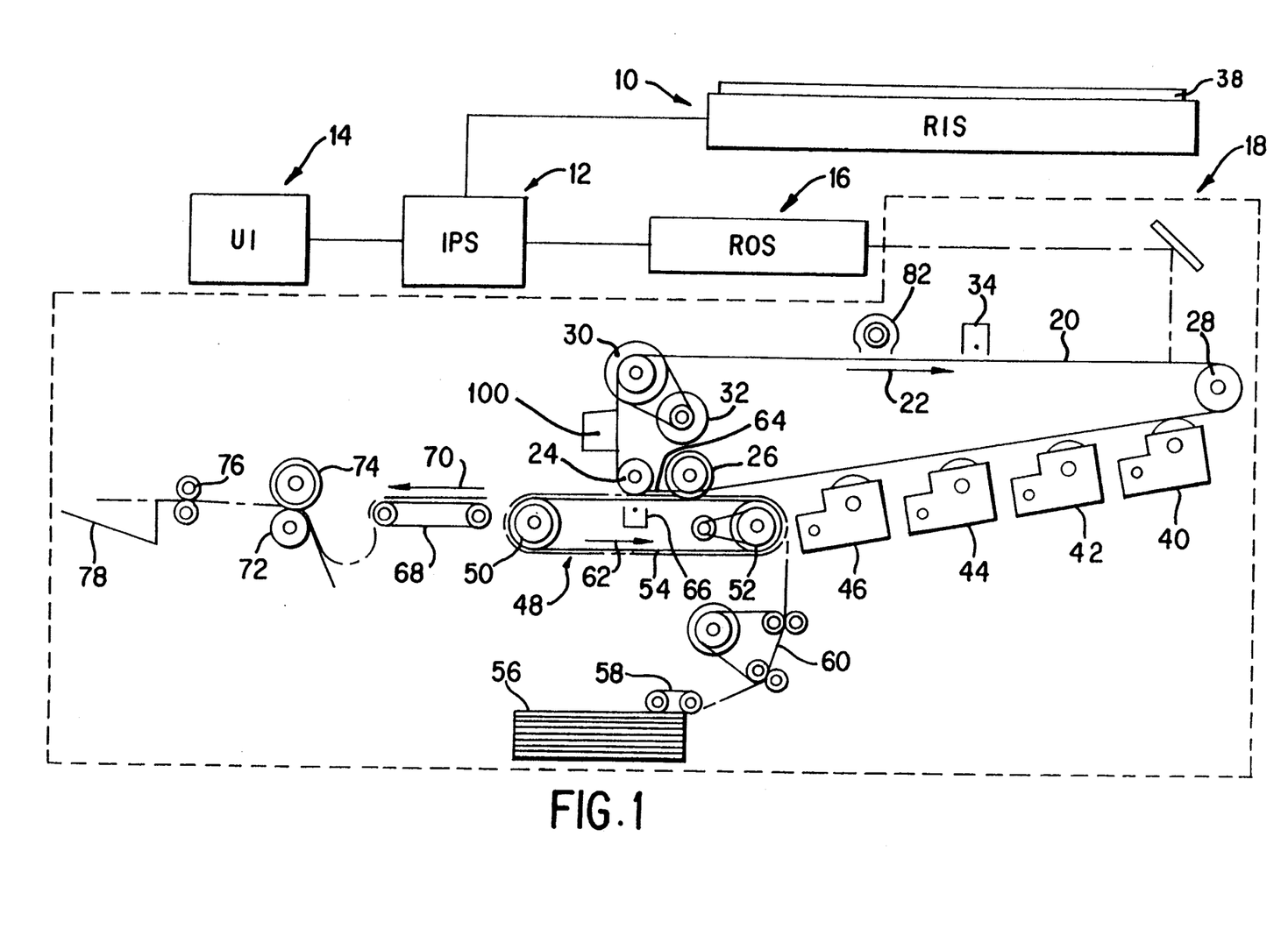
FIG. 1 is a schematic elevational view of a low cost electronic reprographic image forming apparatus usable with the present invention.

For a general understanding of the features of the present invention, reference is made to the drawings. In the drawings, like reference numerals have been used throughout to designate identical elements. FIG. 1 is a schematic elevational view of an illustrative electronic reprographic system usable with the present invention. It will become evident from the following discussion that the present invention is equally well suited for use in a wide variety of printing systems, and is not necessarily limited in its application to the particular system shown herein.

Turning initially to FIG. 1, during operation of the printing system, a multi-color original document 38 is positioned on a raster input scanner (RIS), indicated generally by the reference numeral 10. The RIS 10 contains document illumination lamps, optics, a mechanical scanning drive, and a charge coupled device (CCD array). The RIS 10 captures the entire original document and converts it to a series of raster scan lines and measures a set of primary color densities, i.e., red, green and blue densities, at each point of the original document. This information is transmitted to an image processing system (IPS), indicated generally by the reference numeral 12. IPS 12 is the control electronics which prepare and manage the image data flow to the raster output scanner (ROS), indicated generally by the reference numeral 16. A user interface (UI), indicated generally by the reference numeral 14, is in communication with the IPS 12. The UI 14 enables the operator to control the various operator adjustable functions. The output signal from the UI 14 is transmitted to IPS 12. The signal corresponding to the desired image is transmitted from IPS 12 to ROS 16, which creates the output copy image. ROS 16 lays out the image in a series of horizontal scan lines with each line having a specified number of pixels per inch. The ROS 16 includes a laser having a rotating polygon mirror block associated therewith. The ROS 16 exposes the charged photoconductive surface of the printer, indicated generally by the reference numeral 18, to achieve a set of subtractive primary latent images.

The latent images are developed with cyan, magenta, and yellow developer material, respectively. These developed images are transferred to a copy sheet in superimposed registration with one another to form a multi-colored image on the copy sheet. This multi-colored image is then fused to the copy sheet forming a color copy.

With continued reference to FIG. 1, printer or marking engine 18 is an electrophotographic printing machine. The electrophotographic printing machine employs a photoconductive belt 20. Belt 20 moves in the direction of arrow 22 to advance successive portions of the photoconductive surface sequentially through the various processing stations disposed about the path of movement thereof. Belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through the charging station. At the charging station, a corona generating device, indicated generally by the reference numeral 34 charges photoconductive belt 20 to a relatively high, substantially uniform potential.

Next, the charged photoconductive surface is rotated to the exposure station. The exposure station includes the RIS 10 having a multicolored original document 38 positioned thereat. The RIS 10 captures the entire image from the original document 38 and converts it to a series of raster scan lines which are transmitted as electrical signals to IPS 12. The electrical signals from the RIS 10 correspond to the red, green and blue densities at each point in the document. The IPS 12 converts the set of red, green and blue density signals, i.e. the set of signals corresponding to the primary color densities of original document 38, to a set of colorimetric coordinates.

The operator actuates the appropriate keys of the UI 14 to adjust the parameters of the copy. UI 14 may be any suitable control panel, such as, for example, an edit pad, providing an operator interface with the system. The output signals from the UI 14 are transmitted to the IPS 12. The IPS 12 then transmits signals corresponding to the desired image to ROS 16. ROS 16 includes a laser with rotating polygon mirror blocks. Preferably, a nine facet polygon is used. The ROS illuminates the charged portion of the photoconductive belt 20 at a rate of about 400 pixels per inch. The ROS 16 will expose the photoconductive belt to record three latent images. One latent image is adapted to be developed with cyan developer material. Another latent image is adapted to be developed with magenta developer material with the third latent image being developed with yellow developer material. The latent images formed by the ROS 16 on the photoconductive belt correspond to the signals from IPS 12. The RIS 10 must scan the original document a separate time for each latent image to be formed on photoreceptor 20 because the copier does not possess sufficient memory to store the data for an entire document sheet.

After the electrostatic latent image has been recorded on photoconductive belt 20, the belt 20 advances the electrostatic latent image to the development station. The development station includes four individual developer units generally indicated by the reference numerals 40, 42, 44 and 46. The developer units are of a type generally referred to in the art as "magnetic brush development units". Typically, a magnetic brush development system employs a magnetizable developer material including magnetic carrier granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface.

Developer units 40, 42 and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with the blue absorbing (yellow) toner particles, while the red separation is developed by developer unit 44 with red absorbing (cyan) toner particles. Developer unit 46 contains black toner particles and may be used to develop the electrostatic latent image formed from a black and white original document.

Each of the developer units is moved into and out of the operative position. In the operative position, the magnetic brush is closely adjacent to the photoconductive belt, while, in the non-operative position, the magnetic brush is spaced therefrom. During development of each electrostatic latent image only one developer unit is in the operative position, the remaining developer units are in the non-operative position. This insures that each electrostatic latent image is developed with toner particles of the appropriate color without co-mingling. In FIG. 1, developer unit 40 is shown in the operative position with developer units 42, 44 and 46 being in the non-operative position.

After development, the toner image is moved to the transfer station where the toner image is transferred to a copy sheet of support material, such as, for example, plain paper. At the transfer station, the sheet transport apparatus, indicated generally by the reference numeral 48, moves the sheet into contact with photoconductive belt 20. Sheet transport 48 has a pair of spaced belts 54 entrained about rolls 50 and 52. A gripper extends between belts 54 and moves in unison therewith. The sheet is advanced from a stack of sheets 56 disposed on a tray. A friction retard feeder 58 advances the uppermost sheet from stack 56 onto a pretransfer transport 60. Transport 60 advances the sheet to sheet transport 48. The sheet is advanced by transport 60 in synchronism with the movement of the gripper. In this way, the leading edge of the sheet arrives at a preselected position, i.e. a loading zone, to be received by the open gripper. The gripper then closes securing the sheet thereto for movement therewith in a recirculating path. The leading edge of the sheet is secured releasably by the gripper. Further details of a method of calibrating the registration of the sheet with the gripper can be found in U.S. Pat. No. 4,986,526 to Richard M. Dastin, the disclosure of which is incorporated herein by reference.

As the belts move in the direction of arrow 62, the sheet moves into contact with the photoconductive belt, in synchronism with the toner image developed thereon. At transfer zone 64, a corona generating device 66 sprays ions onto the backside of the sheet so as to charge the sheet to the proper magnitude and polarity for attracting the toner image from photoconductive belt 20 thereto. The sheet remains secured to the gripper so as to move in a recirculating path for three cycles. In this way, three different color toner images are transferred to the sheet in superimposed registration with one another. One skilled in the art will appreciate that the sheet may move in a recirculating path for four cycles when color black removal is used and up to eight cycles when the information on two original documents is being merged onto a single copy sheet. Each of the electrostatic latent images recorded on the photoconductive surface is developed with the appropriately colored toner which is transferred, in superimposed registration with one another, to the sheet to form the multi-color copy of the colored original document.

After the last transfer operation, the grippers open and release the sheet. Conveyer 68 transports the sheet, in the direction of arrow 70, to the fusing station where the transferred image is permanently fused to the sheet. The fusing station includes heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by forwarding roll pairs 76 to catch tray 78 for subsequent removal therefrom by the machine operator.

The last processing station in the direction of movement of belt 20, as indicated by arrow 22, is a cleaning station 100. Thereafter, lamp 82 illuminates photoconductive belt 20 to remove any residual charge remaining thereon prior to the start of the next successive cycle.

Figure 2:
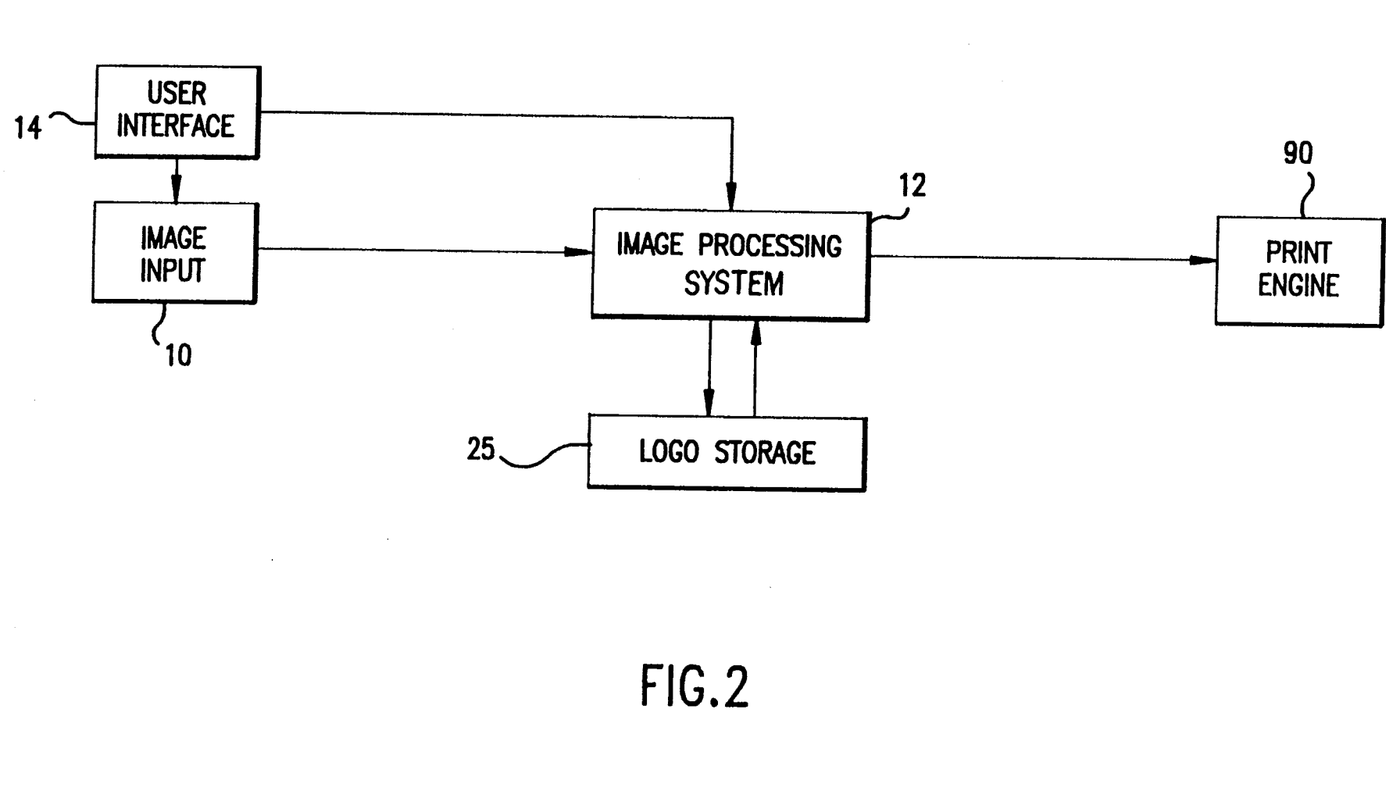
FIG. 2 is a block diagram of one embodiment of the present invention.
Figure 3:
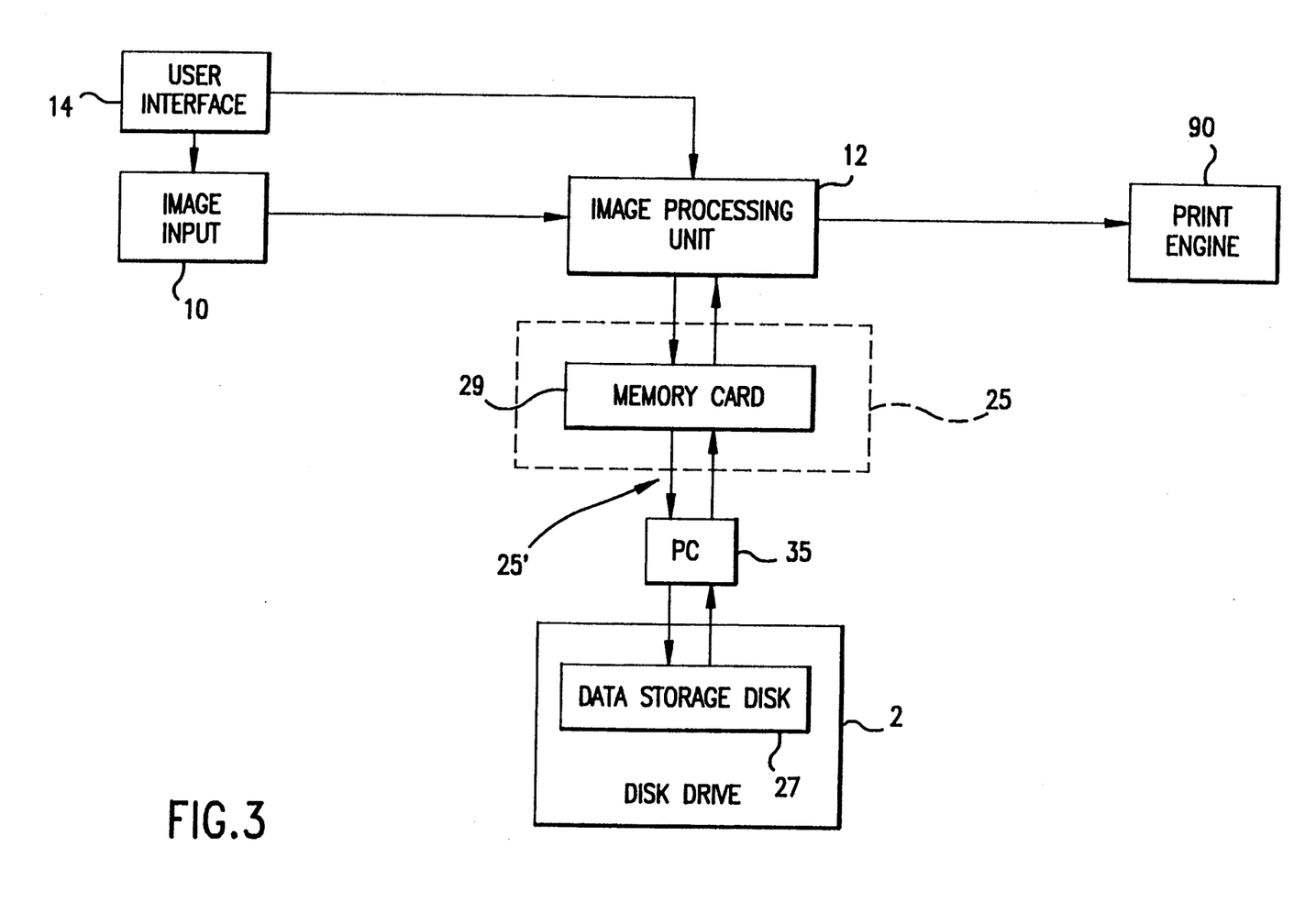
FIG. 3 is a block diagram of another embodiment of the present invention.
Figure 4:
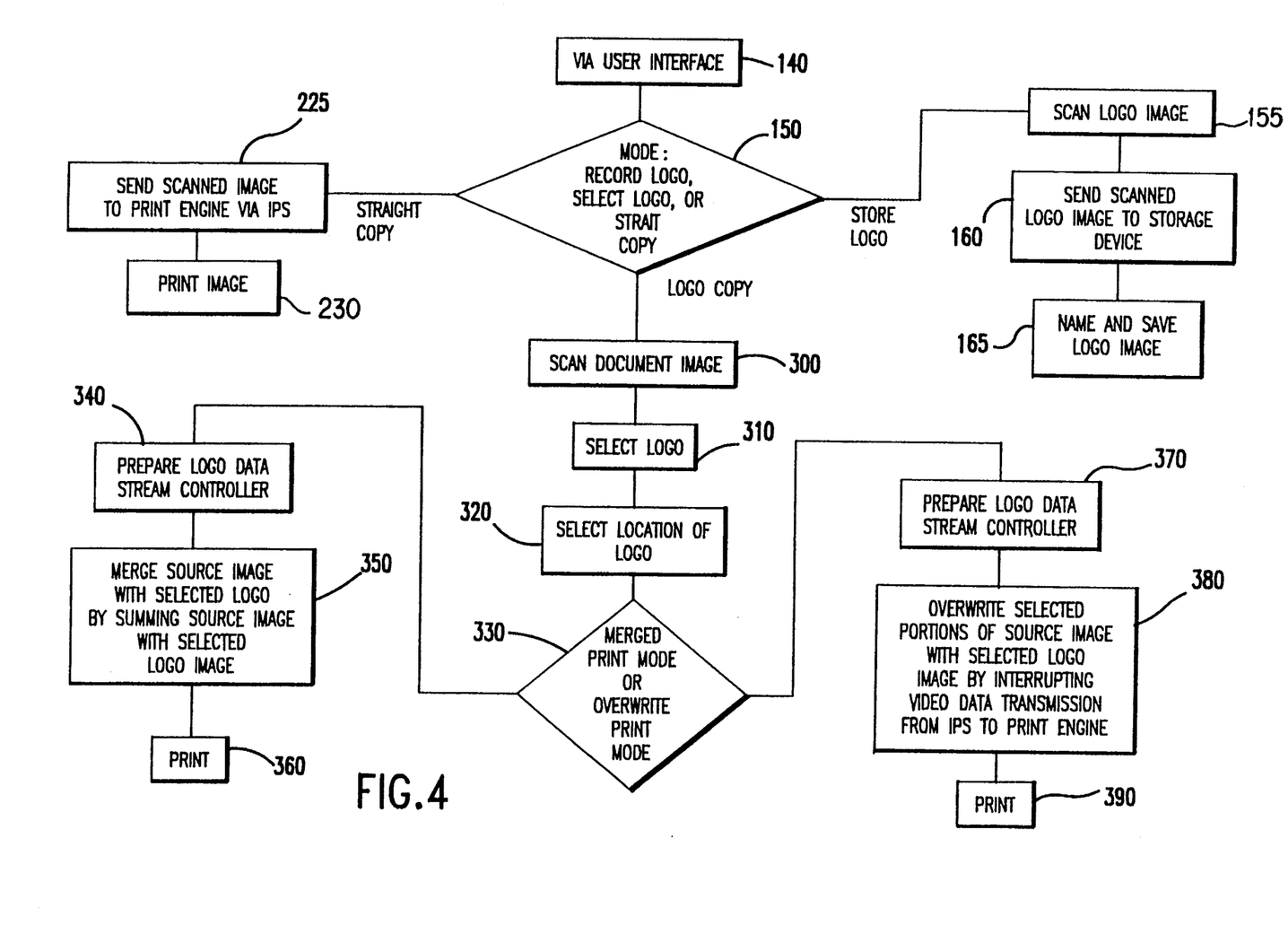
FIG. 4 is a flowchart illustrating a method of copying in accordance with the present invention.

For a general understanding of the features of the present invention, reference is made to FIGS. 2-4. FIG. 2 is a block diagram of an electronic copier (such as shown in FIG. 1) incorporating the features of the present invention. Turning to FIG. 2, during operation of the present invention, an original document is placed on an image input device, such as, for example, RIS 10. RIS 10 captures the image and converts it to a series of video scan lines that are transmitted as electrical signals to the image processing system (IPS) 12. The IPS 12 contains control electronics which prepare and (optionally) merge the image flow to the print engine 90 (i.e., the combination of ROS 16 and printer 18) in accordance with the mode of operation selected by an operator and entered via the user interface (UI) 14. The IPS 12 is in communication with the UI 14. The UI 14, upon receiving input from an operator, informs IPS 12 as to the mode of operation of the copier for the presently scanned image. The modes of operation include, but are not limited to, a logo store (or input) mode, a logo copy mode (with merge print or with overwrite print), and a straight copy mode. The instruction signal from UI 14 is transmitted to IPS 12. RIS 10 captures the image being scanned one video scan line at a time and transmits it to IPS 12 as described above. When the image scanned is a customized logo image to be saved, such as, for example, a logo or letterhead, IPS 12 sends the logo image to a storage device 25 which can be, for example, a memory card or a data storage disk. When the scanned image is a document image to be printed (in accordance with the logo copy or the straight copy modes described below), however, the signal corresponding to the desired image (i.e., the document image with or without a logo image incorporated therein) is transmitted from the IPS 12 to the ROS of the print engine 90 one video scan line at a time.

In the straight copy mode, RIS 10 transmits the image to IPS 12, which, in turn, transmits one video scan line at a time of the scanned image, in real time, to ROS 16 of print engine 90 without the incorporation of additional logo image data. In this mode, a simple copy of the scanned document image is created.

In the logo store mode of operation, IPS 12 receives the electronic logo image signals from RIS 10 and initiates storage of the electronic logo image in logo storage device 25, which can be, for example, an electronic memory card or a data storage disk (in which case, a disk drive is provided with IPS 12 for reading and writing on the data storage disk). A logo thus saved can be used in subsequent copy jobs to either merge with, or overwrite a portion of an original scanned document image with the stored logo image.

In the logo copy with merge print mode, UI 14 informs IPS 12 that the merged printing of a stored logo image and an original document image currently being scanned by RIS 10 is to be implemented. In this case, the operator, through UI 14, specifies an area of the original document where the customized logo image is to be placed. Then, as RIS 10 transmits the document image data to IPS 12, IPS 12 merges the input document image data with the retrieved logo image data. When in the merged logo copy mode, IPS 12 essentially performs a logical OR function with respect to the document image data and the selected logo image data to create an output image that contains all aspects of both the original scanned document image and the retrieved logo image. This effectively superimposes the logo image on the original document image while retaining all the features of the original document image. This electronically merged output image is transmitted in real time to the ROS 16 of print engine 90 which subsequently outputs the new merged image consisting of the original scanned document image superimposed with the specified logo image at the specified location.

Another way to incorporate a stored logo image on an original document image is to overwrite the original document image with the retrieved logo image. In the logo copy with overwrite print mode, the operator specifies the overwrite mode through UI 14 to IPS 12. RIS 10 scans the original document image and transmits the electronic image to IPS 12. IPS 12, meanwhile, retrieves a user specified logo image from storage apparatus 25 and, at a location specified by the operator through UI 14, interrupts the flow of video information comprising the electronic image of the original document and replaces it with the video information of the specified retrieved logo image. IPS 12 continues processing of the original document image where the logo image overwrite is not specified. The output image is transmitted line by line in this manner to the ROS 16 of print engine 90 which then outputs the new composite image. The result of this mode of operation is to effectively mask out those portions of the original document image where the logo is to be inserted. This mode most closely resembles a true manual cut and paste operation.

Thus, unlike some previous devices which required a user to purchase a ROM chip containing logo image data of a specified logo image, and then install the ROM chip in the copier (replacing any existing ROM chips), the present invention permits logo images to be directly scanned and entered into a small, low cost memory in the copier by the user. The user need not rely on anyone to provide additional hardware or programming. Additionally, it is preferable that storage medium 25 (the electronic memory card or the data storage disk) has sufficient memory space for storing plural logo images. This permits additional logos to be stored without deleting or otherwise losing earlier stored logos. Each time a new logo is stored, UI 14 prompts the user to name that logo (data file) with a name unique from the other stored logos. When incorporating a logo with a document being scanned (i.e., when operating in the logo copy mode) UI 14 prompts the user to specify which logo file should be retrieved.

In an alternative embodiment, as illustrated in FIG. 3, the logo image storage means 25 comprises an electronic memory card 29 which can be connected to a PC 35 via an image data input/output (I/O) portal 25'. The operation of the system according to this embodiment would be identical to that described above with the exception that the logo image data can now be downloaded from the data storage disk 27 to the memory card 29 via the PC 35. This configuration is used when the number of logo images to be stored exceeds the capacity of the memory card 29. In this embodiment, excess logo images are stored on the data disk 27 which is accessible by the PC 35 which interfaces with the disk drive 2. When a logo that resides on the data disk 27 is required by the user to be printed on a scanned document, the PC 35 accesses the data disk 27 through the disk drive 2. Once the PC 35 has downloaded the requested logo image data from the data disk 27, the PC 35 initiates a transfer of the logo image data to the memory card 29 through the input port 25' of the memory card 29.

When a logo image is being scanned for storage in the memory means 25, the embodiment shown in FIG. 3 can operate to store the logo data in the data disk 27. The user specifies the logo store mode via the UI 14. The logo is then scanned by the RIS 10 and sent to the memory card 29 by the IPS 12. When the memory card reaches a predetermined capacity, it initiates a transfer of excess logo image data to the data disk 27. The image data is output to the PC 35 from the memory card output port and then from the PC 35 to the disk drive 2 that houses the data disk 27 which eventually receives the logo image data.

In addition to providing storage for the excess logo images, the embodiment shown in FIG. 3 allows the user to generate logo images at the PC 35 rather than being required to scan the logo image via the RIS 10. In an embodiment using the PC 35 for logo image generation and storage, the apparatus functions in the same manner described above except that the logo store mode (i.e., scanning the logo before being able to save it) would not be a necessary precursor to implementation of logo copy functions, such as, for example, merge printing and overwrite printing.

The embodiment shown in FIG. 3 also provides increased system speed. By downloading desired logo images from the data disk 27 and/or the PC 35, the higher speed memory card 29 is used to download logo image data to IPS 12. In systems using only the data disk 27 and disk drive 2 as the image storage means 25, the speed of the system can be limited by various disk access requirements that are not present when using a memory card 29. A memory card 29 alone, however, does not have as much storage capacity as a data disk 27, therefore, the highest performance embodiment of the system includes both the data disk 27 and the memory card 29. However, depending upon user requirements, a system using only one storage medium may be the most cost-effective solution.

FIG. 4 shows a flowchart illustrating methods of operation of the present invention. Beginning with step 140, the operator selects the print mode and selects customized image placement commands relating to the printing modes and placement of the logo image on the original. The commands are then entered via the UI 14 in step 140. The UI 14 then transmits this information to the IPS 12.

In step 150, the IPS 12 is instructed to either store a logo, copy a document with a previously stored logo, or perform a straight copy operation. In the store mode, the IPS 12 reads the scanned logo image in step 155, stores the image into the logo image data storage means in step 160, and finally names and saves the logo image in step 165.

If the result of step 150 is to copy a document along with a stored logo image, the document image is scanned by the RIS 10 in step 300. The desired logo is identified by the user in step 310 and the location for placement of the selected logo is identified in step 320. UI 14 enables the operator to specify the location on a sample document to which a logo is to be merged or overwritten. The size of the logo can also be selected via the UI 14. The IPS 12 then enters another decisional step 330 to determine whether the merge print mode or overwrite print mode is to be used. If the merge print mode is selected, the video data stream controller of the IPS 12 is prepared to receive the logo image data from the logo storage means 25 in step 340. The IPS 12 then merges the logo and the scanned original image, as described above, in real time and sends the resulting merged video data stream to the print engine in step 350. The merged image is then printed and output by the print engine in step 360. If, however, the overwrite print mode is chosen in step 330, the video data stream controller of the IPS 12 is prepared to receive the logo image data from the logo storage means 25 in step 370. The IPS 12 then overwrites the document image with the selected logo image by interrupting the video data stream of the scanned document image at the logo insertion area, identified in step 320, and sends the overwritten image to the print engine in step 380. The overwritten image is then printed and output by the print engine in step 390.

If, in step 150, no logo functions are specified, a straight copy operation is carried out, wherein the scanned image is transmitted directly from RIS 10 to IPS 12 and from the IPS 12 to print engine 90 in step 225 without the introduction of any additional logo images, and then the image is printed in step 230.

While this invention has been described in conjunction with a specific embodiment thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An image reproduction apparatus, comprising:
   image input means for scanning document images and logo images to produce document image data and logo image data, respectively, said logo image data occupying a substantially smaller area than said document image data;
   a print engine for printing an output image on a copy sheet in accordance with output image data received by said print engine;
   logo image data storage means for simultaneously storing logo image data for a plurality of said logo images;
   image processing means for processing and transmitting said document image data and said logo image data between said image input means, said print engine, and said logo image data storage means, said image processing means defining said output image data to be supplied to said print engine; and
   user interface means for defining modes of operation of said image reproduction apparatus, said modes including:
   a straight copy mode in which said image processing means transmits said document data from said image input means to said print engine as said output image data without editing of said document image data so as to produce an output image which is a copy of said document image;
   a logo image data storing mode in which said image processing means stores logo image data input through said image input means in the logo image data storage means; and
   a logo copy mode which provides the only access to editing with the stored logo image data and in which said image processing means transmits said document data from said image input means to said print engine as said output image data while editing said document image data with logo image data corresponding to user interface selected logo image so as to produce an output image which is a copy of said document image edited to incorporate said selected logo image therein, wherein when in said logo copy mode, said image processing means is selectively operable in one of a logo merge mode for merging the selected logo image with the document image and a logo overwrite mode for overwriting a portion of the document image with the selected logo image.

2. The apparatus of claim 1, wherein said logo image storage means is at least one of a data storage disk and an electronic memory card.

3. The apparatus of claim 1, wherein said user interface means comprises an edit pad.

4. The apparatus of claim 1, wherein said image input means is a raster input scanner.

5. The apparatus of claim 1, wherein said image processing means receives, processes and transmits one video scan line of data at a time, in real time.

6. The apparatus of claim 1, wherein said image storage means is an electronic memory card.

7. The apparatus of claim 1, wherein said image storage means includes:
a memory card coupled to said image processing means;
a data storage disk; and
an interface means for providing communications between said data storage disk and said memory card for supplying logo image data from said data storage disk to said memory card.

8. The apparatus of claim 1, wherein said print engine includes:
a raster output scanner for receiving said output image data from said image processing means, and for exposing a photosensitive recording medium in accordance with said image data to form a latent image thereon;
means for toner developing said latent image into a toner image; and
means for transferring said toner image from said photosensitive recording medium to said copy sheet.

9. An image reproduction apparatus, comprising:
image input means for scanning document images;
a print engine for printing an output image on a copy sheet in accordance with output image data received by said print engine;
logo image data storage means for simultaneously storing logo image data for a plurality of logo images, said logo image data occupying a substantially smaller area than said document image data; and
image processing means for processing and transmitting said document image data and said logo image data between said image input means, said print engine, and said logo image data storage means, said image processing means defining said output image data to be supplied to said print engine, wherein said image processing means is selectively operable in:
a straight copy mode in which said image processing means transmits said document data from said image input means to said print engine as said output image data without editing of said document image data so as to produce an output image which is a copy of document image; and
a logo copy mode in which said image processing means transmits said document data from said image input means to said print engine as said output image data while editing said document image data with logo image data corresponding to a selected logo image so as to produce an output image which is a copy of said document image edited to incorporate said selected logo image therein, wherein when in said logo copy mode, said image processing means is selectively operable in one of a logo merge mode for merging the selected logo image with the document image and a logo overwrite mode for overwriting a portion of the document image with the selected logo image.

10. The apparatus of claim 9, wherein said image processing means is also selectively operable in a logo image data storing mode in which said image processing means stores logo image data input through said image input means in the logo image data storage means, said logo image data being input by scanning a logo image with said image input means.

11. The apparatus of claim 9, further comprising means for storing logo image data into said logo image data storage means.

12. The apparatus of claim 9, wherein said logo image storage means is at least one of a data storage disk and an electronic memory card.

13. The apparatus of claim 9, wherein said image processing means receives, processes and transmits one video scan line of data at a time, in real time.

14. The apparatus of claim 9, wherein said image storage means is an electronic memory card.

15. The apparatus of claim 9, wherein said image storage means includes:
a memory card coupled to said image processing means;
a data storage disk; and
an interface means for providing communications between said data storage disk and said memory card for supplying logo image data from said data storage disk to said memory card.

16. The apparatus of claim 9, wherein said print engine includes:
a raster output scanner for receiving said output image data from said image processing means, and for exposing a photosensitive recording medium in accordance with said image data to forma latent image thereon;
means for toner developing said latent image into a toner image; and
means for transferring said toner image from said photosensitive recording medium to said copy sheet.

17. A method of using an image reproduction device to store logo images and to copy document images so as to incorporate a stored logo image therein, said image reproduction device including an image input means for scanning document images and converting the document images to document image data, a print engine for printing an output image on a copy sheet in accordance with output image data received by said print engine, logo image data storage means for simultaneously storing logo image data for a plurality of logo images, said logo image data occupying a substantially smaller area than said document image data, and image processing means for processing and transmitting said document image data in real time without storage of said document image data to said print engine as output image data, said image processing means also selectively processing and transmitting said logo image data at least between said logo image data storage means and said print engine to selectively incorporate said logo image data into said output image data to be supplied to said print engine, comprising the steps of:
storing logo image data corresponding to a plurality of said logo images as distinctly named files in said logo image data storage means; and
processing and transmitting output image data of an output image with said image processing means to said print engine, said processing being performed in real time with the scanning of an original document by said image input means to produce original document data, said processing also including incorporating logo image data of a selected one of said plurality of logo images stored in said logo image data storage means into the original document image data so that said output image corresponds to the original document image having the selected logo image incorporated therein, wherein the logo image incorporated into the original document image is incorporated by one of merging the selected logo image with the document image and overwriting a portion of the document image with the selected logo image.

18. The method of claim 17, wherein said storing of said logo image data comprises the steps of:

scanning a logo image with said image input means to produce logo image data corresponding to said logo image;

naming said logo image data; and storing the named logo image data as a file in said logo image storage means via said image processing means.

19. The method of claim 17, wherein said logo image storage means is a disk drive for reading logo image data from a data storage disk, coupled to the image processing means, said step of storing said logo images comprises the steps of:

generating said logo image data on an external image generator;

storing said logo image data on at least one data storage disk; and placing a data storage disk containing desired logo image data in the disk drive.

20. The method of claim 17, wherein said logo image storage means is an electronic memory card, said step of storing said logo image data comprises the steps of:

generating logo image data on an external image generator, said image generator having a memory and an image data storage means; and transferring said logo image data from said external image generator to the electronic memory card via an image data input port of said electronic memory card.

* * * * *